July 12, 1938.   R. H. LAWSON ET AL   2,123,534
CAM BLOCK FOR KNITTING MACHINES
Filed Aug. 3, 1935    7 Sheets-Sheet 1

INVENTORS:
ROBERT H. LAWSON,
WILLIAM L. SMITH JR.,
By Roy F. Lovell,
ATT'Y.

July 12, 1938.  R. H. LAWSON ET AL  2,123,534
CAM BLOCK FOR KNITTING MACHINES
Filed Aug. 3, 1935  7 Sheets-Sheet 2

INVENTORS:
ROBERT H. LAWSON,
WILLIAM L. SMITH JR.,
By Roy F. Lovell,
ATT'Y.

July 12, 1938.  R. H. LAWSON ET AL  2,123,534
CAM BLOCK FOR KNITTING MACHINES
Filed Aug. 3, 1935  7 Sheets-Sheet 3

INVENTORS:
ROBERT H. LAWSON,
WILLIAM L. SMITH JR.,
By Roy F. Lovell
ATT'Y.

July 12, 1938.                R. H. LAWSON ET AL                2,123,534
                        CAM BLOCK FOR KNITTING MACHINES
                            Filed Aug. 3, 1935                7 Sheets-Sheet 4

INVENTORS:
ROBERT H. LAWSON,
WILLIAM L. SMITH JR.,
By Roy F. Lovell,
     ATT'Y.

July 12, 1938.  R. H. LAWSON ET AL  2,123,534
CAM BLOCK FOR KNITTING MACHINES
Filed Aug. 3, 1935   7 Sheets-Sheet 5
FIG. 20.   FIG. 19.
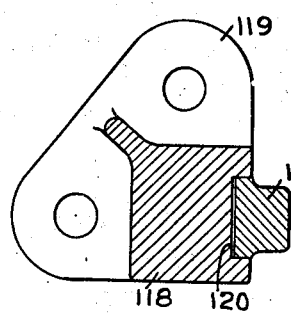
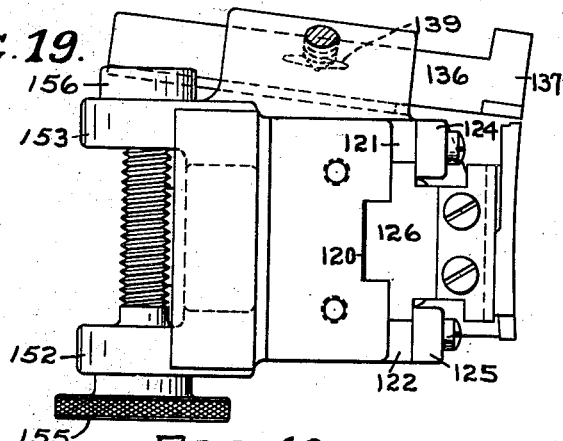
FIG. 17.   FIG. 18.
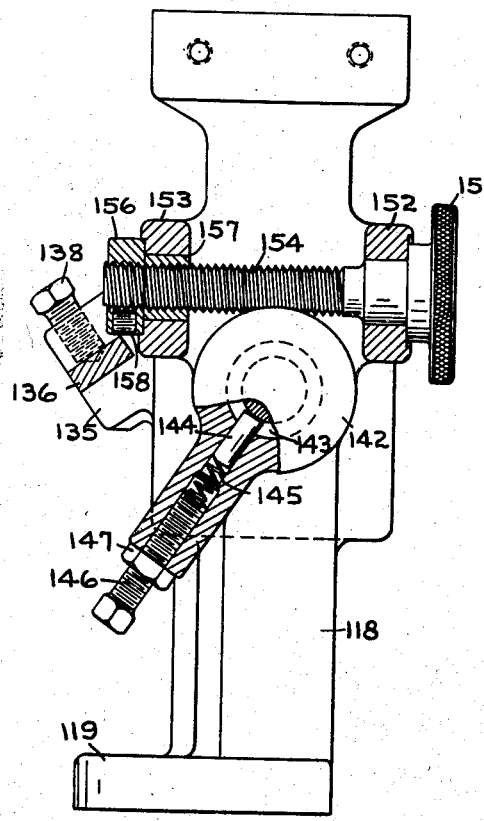
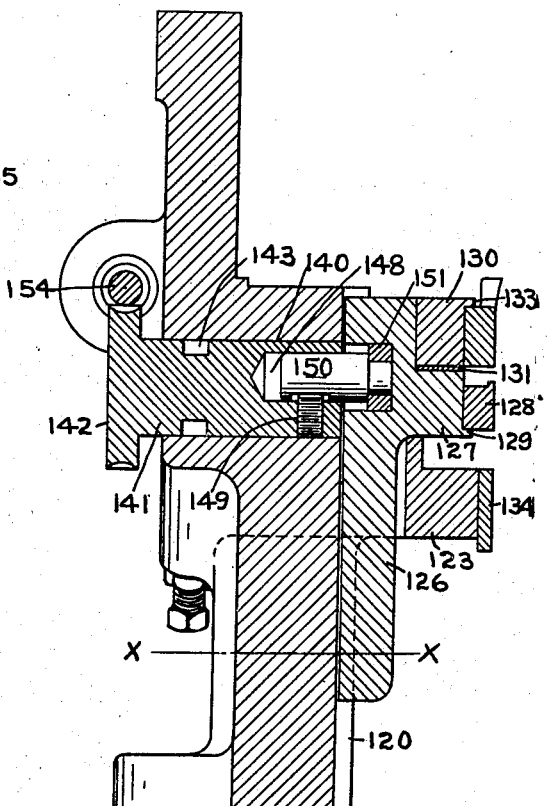
INVENTORS:
ROBERT H. LAWSON,
WILLIAM L. SMITH JR,
BY Roy F. Lovell,
ATT'Y.

July 12, 1938.  R. H. LAWSON ET AL  2,123,534
CAM BLOCK FOR KNITTING MACHINES
Filed Aug. 3, 1935   7 Sheets-Sheet 6
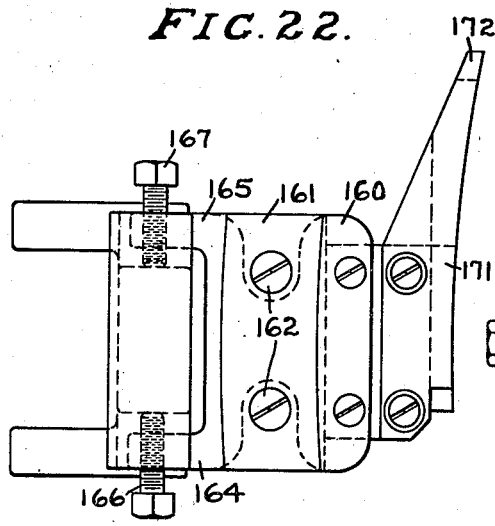
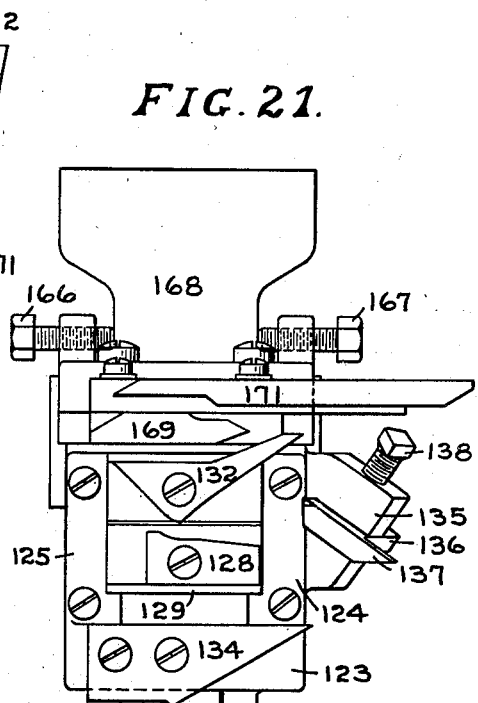
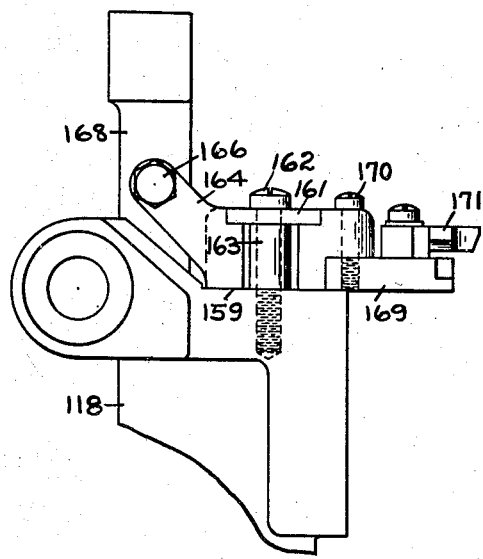
INVENTORS:
ROBERT H. LAWSON,
WILLIAM L. SMITH JR,
BY Roy T. Lovell
ATT'Y.

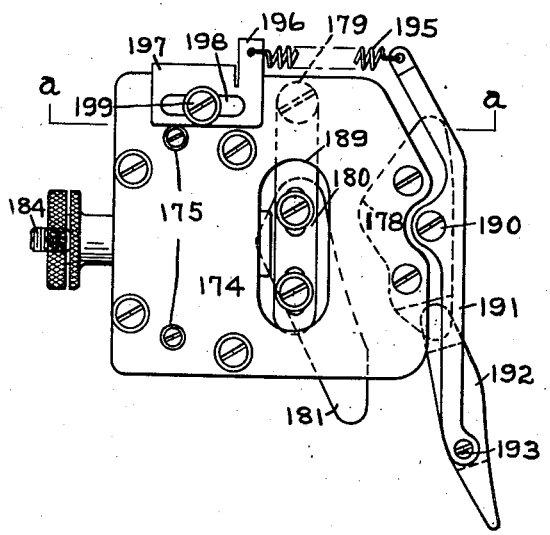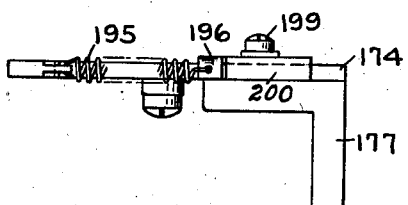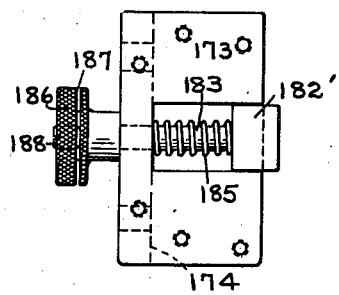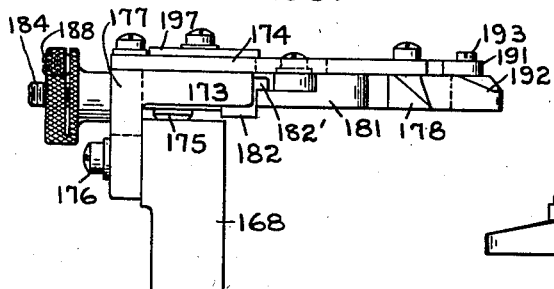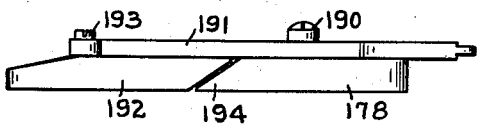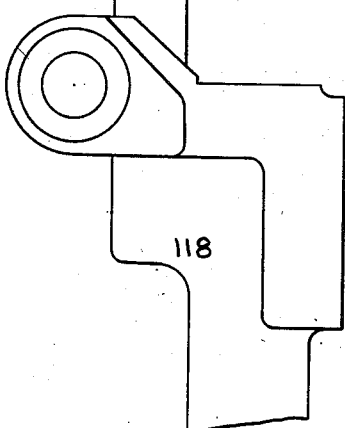

Patented July 12, 1938

2,123,534

UNITED STATES PATENT OFFICE 2,123,534

CAM BLOCK FOR KNITTING MACHINES

Robert H. Lawson and William L. Smith, Jr., Pawtucket, R. I., assignors to Hemphill Company, Central Falls, R. I., a corporation of Massachusetts Application August 3, 1935, Serial No. 34,579
In Canada August 9, 1934

12 Claims. (Cl. 66—57)

This invention relates to cam blocks for knitting machines and more especially for multi-feed knitting machines. This case is a continuation in part of U. S. application Ser. No. 706,082, filed January 10, 1934, now Patent No. 2,067,877.

In the drawings:

Fig. 17 is an elevation, partly in section, showing a cam block which is a modification of that shown in Fig. 1;

Fig. 18 is a sectional view taken along the vertical center line of Fig. 17;

Fig. 19 is a plan view of the mechanism shown in Fig. 17;

Fig. 20 is a sectional view taken along the line X—X, Fig. 18;

Fig. 21 is an elevation showing the inner side of this modified form of cam block;

Fig. 22 is a plan view showing the modified form of jack cam;

Fig. 23 is a side elevation of the cam shown in Fig. 22;

Fig. 24 is a plan view of a modified form of sinker cam and sinker pressing cam;

Fig. 25 is an elevation of this modified sinker cam shown in position on its cam block;

Fig. 26 is an elevation showing in detail the spring control for the pressing cam, this view showing only the part of the assembly above the reference line a—a in Fig. 24;

Fig. 27 is a detail view of the sinker cam adjusting screw and part of its bracket; and Fig. 28 is a detail view of the sinker pressing cam and the arm upon which it is mounted.

The cam block with cams shown in Figs. 1 through 16 is particularly adapted for use in multi-feed knitting machines of the rotary needle cylinder type but it is not necessarily so limited and may be used with machines of the rotating cam type if so desired. The cams shown in these figures are adapted to control needles which have been selected to knit or to tuck or to produce other fancy stitches in accordance with the mechanism disclosed in application 706,082 above mentioned. In one embodiment of that case needles which were to knit were controlled by needle cams only, whereas, needles which were not to knit or which were to fail to cast off but at the same time to take yarn in their hooks, were controlled by jacks adapted to pull said needles downwardly either below the yarn taking position or the cast off position as the case may be.

Figure 2:
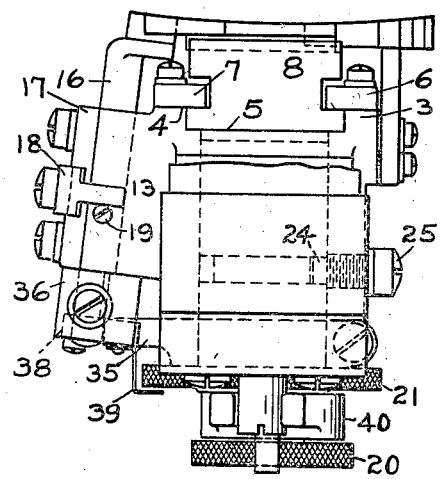
Fig. 2 is a plan view corresponding to Fig. 1.

Referring to Figs. 1–5 mechanism is shown for very accurately adjusting the needle controlling cams, said adjustment being possible in a vertical plane only, whereby the stitch length may be varied either for purposes of knitting tighter or looser fabric or for adjusting certain cams about the entire machine to knit a definite length stitch in accordance with that being produced on one of the cam blocks which has been taken as a standard. The mechanism consists of an upright post 1 which has projecting feet as shown at 2 with drilled holes therein for the purpose of attaching the block to the machine frame by means of bolts or the like. On the side facing the needle cylinder, post 1 has a boss forming two projecting flanges 3 and 4 between which is machined a groove indicated at 5. Two plates 6 and 7 are attached by screws to the flanges 3 and 4 of groove 5 forming a suitable slide within which a cross-head 8 which carries needle cams 9 and 10 is adapted to slide. A needle raise cam 11 having an angular projection 12 is attached by suitable screws to the outer side of flange 3. Post 1 is formed with an outwardly projecting extension 13 on the opposite side. This extension has a horizontal, radial slot 14 therein and a cam 15 having a stem 16 attached thereto which is freely slidable in slot 14. For the purpose of maintaining said stem and cam from rotating within slot 14 a plate 17 is attached by means of suitable screws to the flattened outer side of stem 16 and bears on the corresponding flat surface of the extension 13. A vertical groove is cut in the outer side of plate 17 and an angular piece 18 having a slot cut vertically thereof is attached by a screw to plate 17 but is free to be adjusted vertically as restricted by the groove in said plate and the length of slot in the angular piece itself. A pin 19 projects upwardly from element 13 and acts in cooperation with the upper, horizontal, reduced end of sliding piece 18 to lock the cam 15 in or out of position. Referring to Fig. 2 wherein cam 15 is shown in advanced or operative position, element 18 is in front of pin 19 so that the cam is locked in its place. The operator has only to slide angular piece 18 upwardly until it clears the top of pin 19 and then to push cam 15 and its slide 16 outwardly until 18 drops onto the other side of pin 19 whereupon said cam will be locked in inoperative position.

Figure 3:
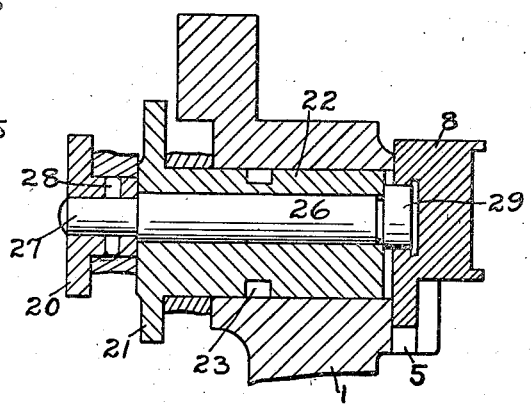
Fig. 3 is a section taken on the vertical center line of Fig. 1, certain parts being cut away for purposes of clearness.
Figure 1:
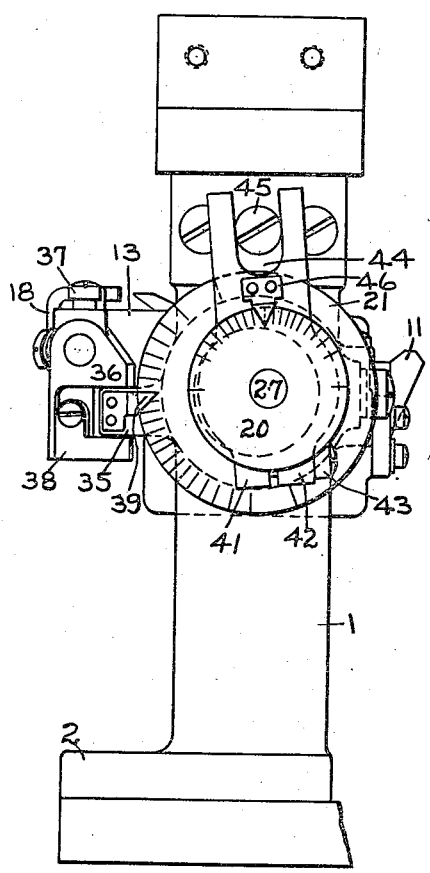
Fig. 1 is an elevation showing the outer side of a cam block according to the invention.
Figure 4:
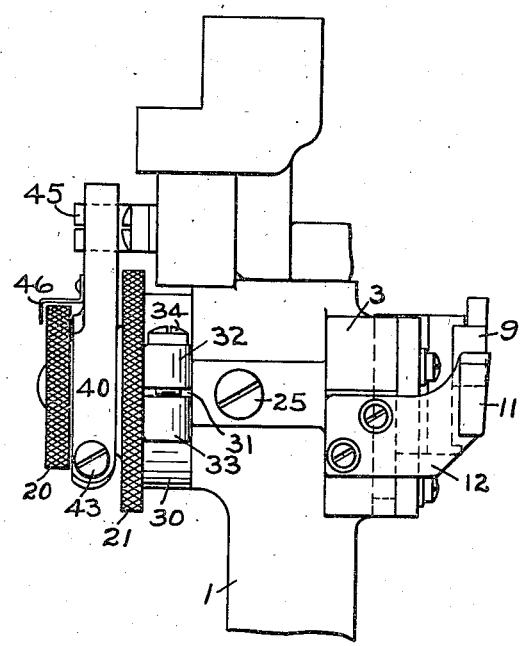
Fig. 4 is an elevation showing one side of the mechanism shown in Fig. 1.

The cross-head 8 which carries cams 9 and 10 is vertically slidable in the guideway formed by groove 5 and plates 6 and 7 by means of small knurled wheels 20 and 21. As shown in Fig. 3, post 1 has been bored out to accommodate a spindle 22 of which knurled wheel 21 forms an integral part. This spindle 22 has a groove 23 therein which is engaged by the end 24 of a screw 25 which passes through one side of said post for the purpose of holding spindle 22 in a fixed axial position. Spindle 22 has a hole drilled parallel to the axis thereof but eccentric to the same, within which is mounted for rotation a small spindle 26 which is turned down at its outer end to form an extension 27, the small knurled wheel 20 being fixed to this extension by a taper pin 28. Spindle 26 has an enlarged portion 29 at its opposite end which engages within a hole in cross-head 8. This portion 29 is slightly eccentric to the spindle itself and it may be seen from an inspection of Fig. 3 that by turning knurled wheel 21 the cross-head and its attached cams will be moved throughout a considerable height while an adjustment by means of knurled wheel 20 results in only a slight motion vertically of the cross-head and cams. The first of these adjustments is used to obtain a reasonable close positioning of cams and the second is used to make the final adjustment which must be extremely accurate.

A collar 30 being split at 31 has two projecting ears 32, 33 through which a screw 34 passes and by means of which the collar is to be clamped about spindle 22. This collar has a projecting lug 35 at its opposite side which engages within a slot formed by an angular member 36 attached to the end of slide 17 by means of a set screw 37, and a second angular member 38 attached to the fixed element 36. The engagement of lug 35 between the co-acting ends of elements 36, 38 serves to keep the collar from rotating, further, when clamped about spindle 22 no motion of the same will be possible thus cams 9 and 10 will be held in a fixed position. A pointer 39 is attached to lug 35 and projects outwardly and along the surface of knurled wheel 21 to serve as a reference point for the graduations upon that wheel which graduations are merely used to secure a preliminary adjustment of the stitch length when setting the machine.

Another collar 40 has ears 41 and 42, on either side of a split therein and a screw 43 passing through ear 42 and threaded within ear 41 serves to clamp the collar about the hub of knurled wheel 20. This collar has a projection at the other side thereon which is slotted as shown at 44 and engages a pin 45 projecting outwardly from a post 1. This projection also has a pointer 46 attached thereto which cooperates with knurled wheel 20 in the same way that pointer 39 cooperated with graduations upon the other wheel 21. In operation both collars are loosened about their respective spindles and an initial adjustment is made by means of turning wheel 21, then collar 30 may be tightened about its spindle to lock the same whereupon a final adjustment may be made by means of wheel 20, and then that wheel and its spindle are to be locked by means of collar 40. For adjustments to be made after the machine has been in operation it is likely that wheel 20 alone will suffice. These adjustments may be made in cooperation with indications of stitch length of any desired nature, but preferably are to be made as a result of indications such as produced by the visual means shown in the case which has been mentioned above.

Figure 6:
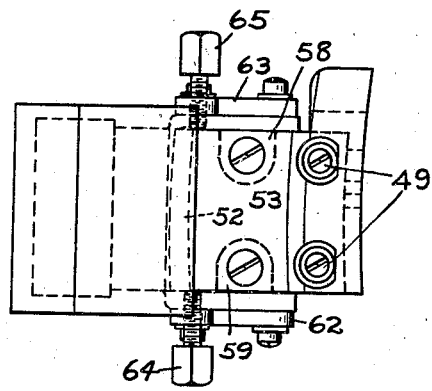
Fig. 6 is a plan view corresponding to Fig. 5 and showing the jack cams and their adjusting mechanism.
Figure 5:
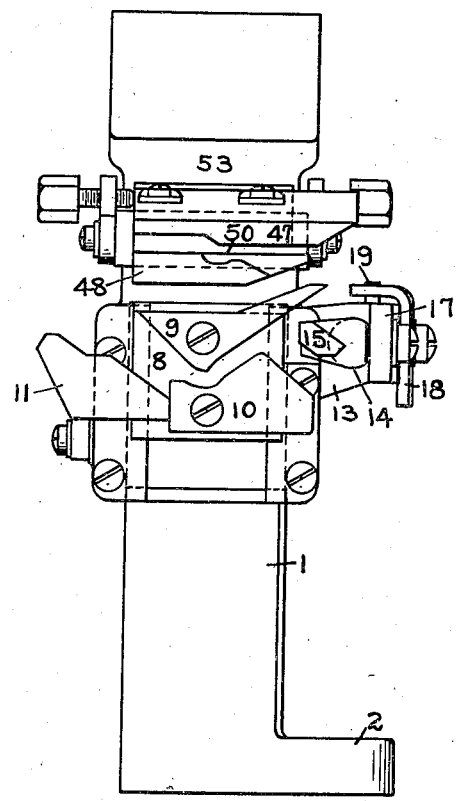
Fig. 5 is an elevation of the cam block showing the inner side, the needle and jack cams mounted thereon.
Figure 7:
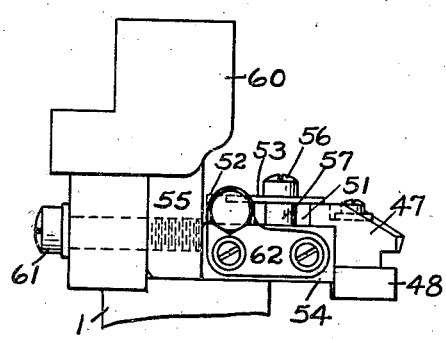
Fig. 7 is an elevation showing one side of these same cams.

In Figs. 5, 6 and 7 we have shown cams which control the jacks for operating sinkers to measure yarn, said cams being indicated by numerals 47 and 48. These cams are attached to each other by means of screws 49 which clamp them together on a line shown at 50. These cams do not necessarily have to be attached to each other, although we do so in this preferred form of the invention, but may be separately attached to the block if desired.

Cam 47 has a stem 51 which projects back to form a raised ledge 52, which cooperates with the rear edge of a plate 53 clamped to the projecting angular portion 54 of bracket 55 by means of screws 56 and spacing member 57. The stem 51 is slotted as shown at 58 and 59 so that it may slide transversely of the element 54 throughout a small extent. Plate 53 cooperates with stem 51 and ledge 52 to maintain them and attached cams 47 and 48 in fixed position radially of the machine but in a manner which allows for adjustment circumferentially of the machine. Element 54 forms an integral extension of 55, and 60 indicates an extension of 55 which has been enlarged and especially shaped for the purpose of mounting the sinker cam set. Screws 61 pass through post 1 and are threaded within element 55 for the purpose of maintaining these members as a unit. At either side of extension 54 we have secured angular pieces 62 and 63. In the vertical extension of these angular pieces, set screws 64 and 65 are threaded for the purpose of adjusting stem 51, cam 47 and cam 48 transversely of the post 1 or circumferentially of the machine. The purpose of this adjustment is to vary the time at which sinkers will be actuated by their jacks so that needles and sinkers will cooperate properly in drawing stitches. Jack cams 47 and 48 would have to be accurately positioned when the machine was assembled but probably would not have to be adjusted at any time thereafter since stitch length is controlled entirely by means of the needle cam adjustment previously described.

Figure 8:
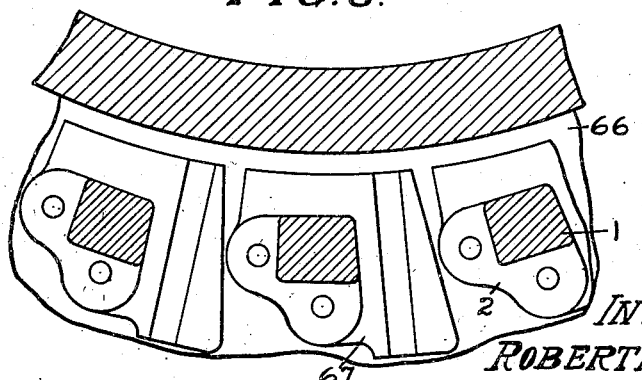
Fig. 8 is a sectional view showing part of the knitting machine frame and a plurality of cam blocks arranged thereon.
Figure 9:
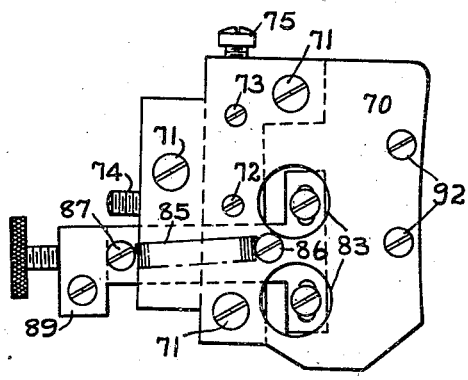
Fig. 9 is a plan view of the sinker cam assembly.
Figure 10:
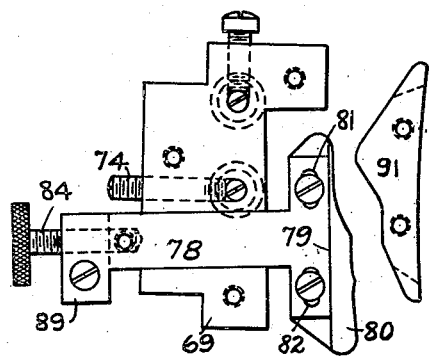
Fig. 10 is a similar view, the cam retaining plate being removed.
Figure 11:
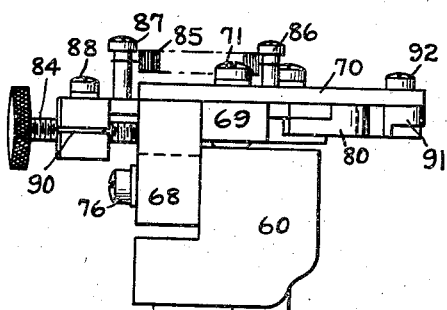
Fig. 11 is an elevation of the cam block showing the sinker cams in place but having the needle and jack cams removed.
Figure 12:
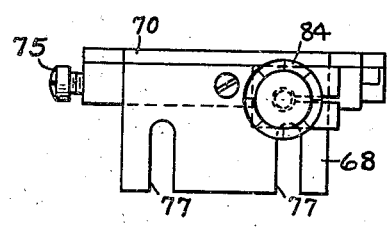
Fig. 12 is an elevation of the mechanism shown in Fig. 9.

In Fig. 8 we have shown a portion of the machine frame or base indicated at 66 and a series of posts are shown in position on this base, spacer members 67 being mounted between the base 66 and the feet 2 of the cam blocks which form the subject matter of this case. From this view one may see the efficient and compacted manner in which the cam block has been constructed, it being possible as a result of this, to arrange an unusually large number of cams about the circumference of a needle cylinder.

Referring to Figs. 9–12 and 15 we will describe the sinker cam assembly which mounts upon the cam block to complete the unit which is adapted to draw stitches at one feed of our multi-feed knitting machine. An angular bracket having a downwardly projecting part 68 and a horizontally extending projection 69 is fastened by means of suitable bolts or screws to a part of the block previously indicated by numeral 60. A plate 70 is attached by means of screws 71 to the bracket 69 and the assembly is maintained in proper vertical adjustment by means of adjusting screws 72 and 73. When these screws have been adjusted to maintain the cam assembly at its proper height the one designated at 72 is locked in position by means of set screw 74 while the one designated at 73 is locked by means of its set screw 75. The vertical adjustment is possible since the clamping screws or bolts 76 bear within suitable slots 77 (Fig. 12) and these screws are not tightened up until the proper vertical adjustment has been obtained.

Bracket 69 is slotted in a direction radial to the center of the needle circle and this slot in cooperation with plate 70 forms a suitable slide for a stem 78 which has a T-shaped head 79 for mounting the sinker projecting cam 80. This head 79 has slots cut therein indicated at 81 and 82 and screws passing therethrough serve to permanently attach cam 80 to the head. If it is desired to adjust cam 80 circumferentially of the machine the screws passing through slots 81, 82 are loosened and the cam may be moved along the direction of the slots until proper adjustment is maintained whereupon said screws are tightened. Plate 70 has two holes 83 cut therein through which it is possible to reach these cam adjusting screws for purposes of making an adjustment when the machine is assembled.

Cam 80 is held in its innermost position according to an adjustment provided by an adjusting screw 84 by means of a spring 85 attached to a pin 86 fixed to plate 70 and also to a pin 87 attached to stem 78. By turning a suitable thumb piece on screw 84 the machine operator may adjust the cam 80 to its proper radial position, a screw 88 providing for locking this adjustment once it has been made. Stem 78 has a projection 89 which is split as shown at 90, the screw 88 passing through the upper section and being threaded in the lower section for the purpose of clamping adjusting screw 84. The tension of spring 85 is sufficient to hold cam 80 inward to project the sinkers inwardly to a proper distance but in case any improper action of the sinkers should occur, cam 80 may be forced outwardly against the tension of spring 85 thereby providing a safeguard against the breakage of the sinker butts and possibly other parts of the machine.

Figure 14:
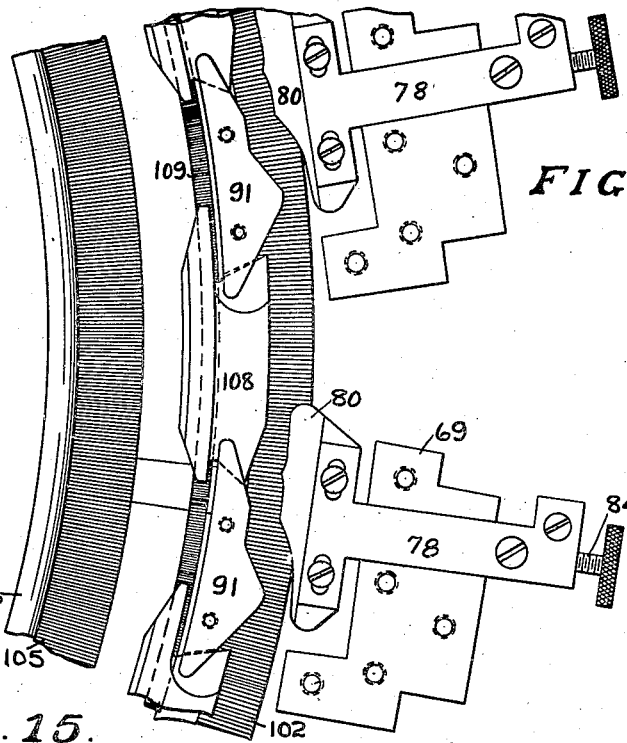
Fig. 14 is a plan view showing the relative positions of the sinker cams.
Figure 15:
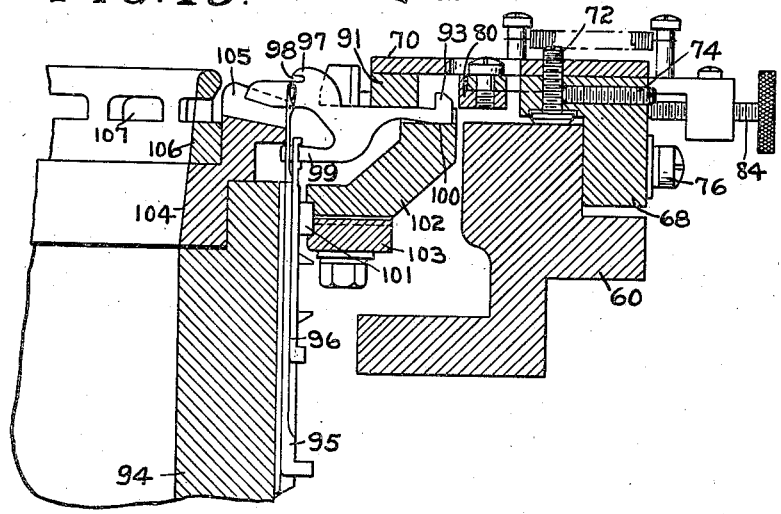
Fig. 15 is a sectional view taken along the center line of one of the cam blocks.

A sinker retracting cam 91 is permanently attached by means of screws 92 to the plate 70. In Figs. 14 and 15 the relative arrangement of these cams about the needle circle is shown and especially in Fig. 15 we have shown the manner in which a sinker butt 93 cooperates with sinker cams 80 and 91. The needle cylinder is shown at 94 and a needle 95 is shown in a trick therein, a sinker operating jack 96 also cooperating with each needle and being mounted in the same trick and preferably in front of the corresponding needle. The sinker is shown having the usual nib 97 and throat 98 and a horizontally projecting element 99 for the purpose of engaging between a suitable pair of lugs at the upper end of jack 96 whereby the sinker will be rocked about its outer end 100 for the purpose of cooperating in measuring stitches. The needle tricks of this machine are preferably formed of separate, hardened elements inserted in a cylinder and these hardened strips or elements have projections 101 thereon, upon which is clamped a support 102 passing about the entire cylinder and having suitable slots cut radially of the machine at its upper surface for supporting the outer end of sinkers. Clamps 103 serve to cooperate with support 102 to hold that latter element in a fixed relationship to cylinder 94 so that it will rotate therewith and will also maintain the sinkers in proper relationship between needles and their outer ends while a stitch ring 104 having corresponding slots 105 serves to maintain the inner ends of these sinkers in proper alignment. A fabric support ring 106 is retained within the stitch ring 104 and serves to hold the fabric against the action of the take-up (not shown) thus relieving the sinkers themselves of the weight of the fabric as it is drawn down by said take-up. This is a very important feature since our sinkers are moved vertically to measure stitches and any additional weight at their inner ends would serve to give jacks 96 an unnecessarily hard action and cause premature wear on both jacks and sinkers. Ring 106 has elongated holes 107 therein for the purpose of allowing lint to drop through.

In referring to Fig. 14 again, we have shown a sinker pressure cam 108 which bears upon the upper surface of the sinker stems to hold them in position between the sinker cams at adjacent cam blocks. These presser cams 108 overlap sinker cams 91 which are recessed at their ends for the purpose of accommodating corresponding recesses in the presser cam. The entire series of presser cams is held inwardly against the backs of sinkers by means of a coil spring 109. Without these presser cams it might be possible for sinkers to ride upwardly in their slots after leaving the sinker cams at one block so that they would strike the cams of the next block and become broken.

Figure 13:
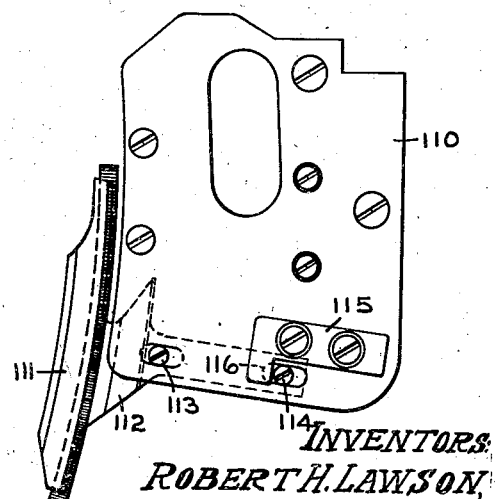
Fig. 13 is a plan view showing a modified form of sinker presser cam.
Figure 16:
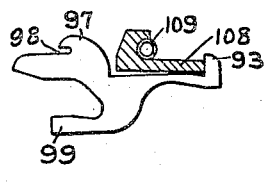
Fig. 16 is a sectional view taken through one of the sinker presser cams between adjacent cam blocks.

In Fig. 13 a modified form of sinker presser cam is shown attached to a plate 110 similar to plate 70. This presser cam is designated at 111 and is of the general shape of the presser cam shown in Fig. 14, but has an extension 112 projecting radially which has two screws 113 and 114 extending upwardly therefrom and projecting through slots in plate 110. A hooked element 115 is adjustably attached to plate 110 by means of screws or other suitable connection. This hooked piece may have slots whereby it may be moved radially so that projection 116 will contact the screw 114 which projects upwardly through a slot and will limit the movement of the presser cam inwardly. A spring 117 similar to 109 is used for the purpose of resiliently holding all the presser cams inwardly against the backs of sinkers.

A modified form of cam block has been shown in Figs. 17–28. The cams of this cam block are adapted to control needles which are to knit or tuck in accordance with a predetermined selection by jacks which push needles up to latch (if latch needles be used) clearing position if said needles are to knit. If the jacks are not selected for pushing needles upwardly said needles may be controlled to tuck or not to knit at all. Certain features of either modification may be used with the other and it is not necessary to employ the sinker or jack cams shown with one modification in combination with the particular needle control described relative to said cam block, nor is it necessary to use the cam adjusting mechanism shown with one modification with that particular modification since it may be used with any cam block which falls within the general class of cam block herein described.

Referring to Figs. 17–21, a post 118 having projecting feet 119 with drilled holes therein for purposes of mounting on the base of the knitting machine, has a vertical slot 120 machined on the inner side thereof; this slot 120 extends throughout the entire height of the inner side of post 118 and a secondary slot or guideway is formed throughout a portion of its extent by means of flanges 121, 122 projecting outwardly from machined surfaces which are in a plane with the outer extent of slot 120. A U-shaped piece indicated at its lower horizontal portion by numeral 123 and having two projections extending upwardly at 124 and 125 is attached by suitable bolts or screws to flanges 121, 122 to complete a guideway within which the cross-head 126 is free to slide in a vertical direction.

Cross-head 126 has a projecting part 127 which carries a needle guard cam 128. This guard cam is securely attached to projection 127 and is maintained at proper elevation by means of projecting lip 129. A block 130 spaced from projection 127 by means of a shim 131 carries stitch cam 132. The stitch cam is held in proper position relative to block 130 as it bears at its upper edge against a lip 133. To obtain the proper spacing between cams 128 and 132 the thickness of shim 131 may be varied.

The lower horizontal portion 123 of the U shaped member before mentioned, projects outwardly and acts to support cam 134 which cam is employed for returning jacks to their lowermost position preparatory to again being selected for operation at the next knitting station.

A boss 135 is cast onto the side of post 118 and has a slot machined therein within which stem 136 of cam 137 is adapted to slide in a direction radial to the needle cylinder. A set screw 138 is threaded down through the upper portion of boss 135 and has a cone shaped end which engages within the slot 139 to lock cam 137 in operative or inoperative position. The set screw 138 engages the V-shaped slot 139 in a manner to hold stem 136 against the back of its cooperating slot and thus in proper radial position. Cam 137 when in operative position serves to raise needles to a tuck position only, needles which are to actually knit having been raised to latch clearing position by means of jacks. In case this cam is in its inoperative position, such needles as are not raised by jacks so that they take yarn and knit will merely pass through the stitch cams at a level below that at which they might take yarn in their hooks and will not knit at that feed.

Post 118 has a hole drilled therethrough at 140 within which is mounted for rotation a spindle 141 enlarged at its outer end to form worm gear 142. The spindle has an annular groove 143 within which bears a plunger 144 for purposes of maintaining spindle 141 in proper axial position. This plunger 144 is held inwardly against the spindle by means of a spring 145 and an adjusting screw 146, in turn held in proper adjustment by a lock nut 147. Spindle 141 has a hole drilled therein at 148 which is slightly eccentric to the spindle itself, and within this hole is fixedly attached by means of set screw 149 a short pin 150 which is turned down at its outer end to fit within a bushing 151. This bushing is held within a drilled hole in cross-head 126 and it may be seen that when spindle 141 is rotated, cross-head 126 will be moved vertically within its guideway for the purpose of adjusting the height of stitch cams 128, 132 relative to the other stitch drawing instrumentality.

Two ears 152 and 153 are cast onto the outside of post 118 and serve to provide bearings within which a worm screw 154 may rotate. This screw has at one end a knurled thumb wheel 155 by means of which the operator may turn said screw and adjust stitch length by means of cams 128, 132. The great reduction afforded by the single threaded worm and small eccentricity of pin 150 make it possible for the operator to adjust stitch length very accurately. Once stitch cams have been adjusted, they will remain in that position without any locking means since it is impossible for the worm wheel to rotate the single threaded worm which is arranged to rotate within its bearings under a slight friction. A nut 156 having a hub portion 157 which serves as a bearing for that end of the worm, is threaded therethrough and may be locked in proper adjustment by means of set screw 158.

In Figs. 21–23 a modified form of sinker jack cam is shown, this cam assembly being much simpler than that of the first form and is also adapted to control these sinker jacks more positively. The post 118 has a flat horizontal surface at 159 upon which slides a cam carrying element 160. As shown in plan view in Fig. 22 this element which carries the jack cams is held in position on surface 159 by means of a plate 161 held in a fixed position by means of screws 162 and spacers 163. This plate bears within an annular groove cut in the top surface of element 160, the groove and the plate being formed on arcs swung from the center of the needle circle so that any adjustment of the cams will not affect their radial position from the needle circle. A certain amount of metal has been cut away from element 160 adjacent spacers 163 so that the carrier may be adjusted without interference. Two ears 164 and 165 project rearwardly and upwardly from the sliding carrier and have adjusting screws 166 and 167 threaded therein for the purpose of adjusting the carrier and its cams circumferentially of the machine, these screws bearing against the sides of a projection 168 extending upwardly and forming an integral part of post 118.

The lower jack cam 169 is attached by means of screws 170 to a recessed portion of carrier 160. The upper jack cam 171 is attached by screws or other suitable connection to the lower cam. This upper cam has a long extension 172 which is adapted to guide the sinker jacks throughout a great part of the distance between adjacent cam blocks.

In Figs. 24–28 a simple and effective form of sinker cam assembly is shown wherein the sinker presser cam is mounted and controlled upon its individual sinker cam assembly. The extension 160 terminates at its upper end in a head suitable for mounting the sinker cam assembly. An angular piece having a horizontal portion 173 is attached by means of screws to a plate 174. A pair of adjusting screws 175 serve to maintain the angular member and plate 174 at a proper height, and when this adjustment has been made, screws 176 bearing within slots cut vertically of the upright portion 177 of said angular member, are tightened to secure the entire sinker cam assembly in position on the extension 168. Plate 174 carries a fixed cam 178 attached by means of suitable connection elements, this cam functioning as a sinker retracting cam. To a pivot 179 fixed to plate 174 is adapted to swing an arm 180 having two slots arranged longitudinally thereof. Sinker projecting cam 181 is adjustably secured to this arm by means of screws passing through the slots and both cam and arm are adapted to be adjusted radially of the machine by mechanism hereinafter described.

A cam contacting element 182 having a lip 182' at the upper edge thereof which bears upon sinker cam 181 has an extension 183 which terminates in a threaded end 184. The threaded end of stem 183 passes through a hole in the vertical portion 177 while the cam contacting piece 182 slides in a suitable slot in horizontal portion 173. A spring 185 serves to maintain the adjusting mechanism and cam 181 in its innermost position, however, if due to improper operation of sinkers, they can not be projected inwardly, spring 185 provides for cam 181 giving way so that no breakage of sinkers will result. A thumb nut 186 is provided for adjusting the position of cam 181, this thumb nut being split as shown at 187 and having a set screw 188 threaded therein for the purpose of locking the same. An elongated hole 189 is cut in plate 174 so that cam 181 may be adjusted on its arm when the assembly is in position on the machine.

Cam 178 projects outwardly from its mounting plate and a screw 190 threaded therein forms a pivot point for the double ended lever 191. A sinker presser cam 192 is pivoted at 193 at one end of this lever 191 and rides upon the top surface of the sinker stems serving to press sinkers downwardly between cam blocks and also to resiliently urge them inwardly. Cam 192 has a beveled end which cooperates with a correspondingly beveled surface 194 on the adjacent end of the sinker retracting cam. The opposite end of lever 191 has a spring 195 connected thereto, the opposite end of said spring being attached to an angular projection 196 on a spring retaining and adjusting element 197. The last mentioned element has a slot 198 cut lengthwise thereof by means of which it is adjustably attached to plate 174 by screw 199. Element 197 has a turned down edge 200 which maintains it in proper alignment with the corresponding edge of plate 174. By means of this adjustment the tension on spring 195 may be varied, thus varying the force with which the presser cams are urged inwardly against the backs of sinkers.

The cam blocks herein described form complete units which may be attached in any desired number to the base of a multi-feed knitting machine and in cooperative relationship with the needles, jacks and sinkers thereof and at any time, one or more blocks may be removed or rendered inoperative to knit without affecting the proper knitting of those remaining. In the case of the second modification, cam 137 is retracted and jacks for that feed are not selected to knit, while in the first modification, cam 15 is retracted and the stitch cams are adjusted to a lowermost position so that needles pass idly thru them. The needle tricks, needles, jacks, and sinkers are very accessible since a block or plurality of blocks may be very quickly removed, such accessibility not being at all possible in the conventional construction wherein a cam ring mounting all the needle cams and a sinker head and cap encompassing the entire complement of sinkers are employed. Such individual units are adapted to cooperate with the cylinder, stitch ring and sinker supporting ring herein shown, but, of course, may be used with fair equivalents of the same or with other needle and sinker assemblies not so constructed.

When it becomes necessary during the ordinary use of the machine to replace a needle, jack or sinker which has become broken or inoperative, the space between the individual cam and jack selector assemblies provides an opening wherein the operator may work to remove the broken part and to insert another. It is not necessary to rotate the machine by hand to a certain opening which has been provided for the purpose as in conventional machines, but merely to rotate the cylinder until the particular needle, jack or sinker enters the nearest space between cam units.

The cam blocks herein illustrated and described are used merely as examples of two specific forms which our invention may take, and it is to be understood that the principles involved are to be broadly construed and that we do not intend to be limited to the specific mechanism herein disclosed except by the scope of the appended claims.

We claim:

1. In a multi-feed knitting machine, a series of like cam assemblies including a plurality of cams, the cams of each assembly being adapted to control the movements of knitting instrumentalities including needles and sinkers, each said cam assembly being wholly mounted on a support readily attachable to and detachable from a knitting machine.

2. For use in a multi-feed knitting machine a readily detachable cam support, cams mounted on the support for controlling the movements of needles, other cam means positioned above the first cam means and attached to the support, said second cam means controlling the movements of other knitting instrumentalities.

3. A readily detachable cam support for a knitting machine, cams thereon for controlling the movements of needles and other cams thereon, and positioned above the first mentioned cams, for imparting longitudinal movements to other and cooperating knitting instrumentalities.

4. A readily detachable cam support for a knitting machine, cams thereon for controlling the movements of needles and other cams thereon including jack cams, and positioned above the first mentioned cams, for imparting longitudinal movements to other and cooperating knitting instrumentalities, the jack cams being positioned between the other two sets of cams.

5. A cam block for knitting machines comprising as a unitary structure, a support, needle cams and sinker cams operatively connected to said support.

6. A cam block for knitting machines comprising as a unitary structure, a support, needle cams, jack cams, and sinker cams operatively attached to said support.

7. A unitary cam structure for knitting machines comprising a support, needle and sinker cams operatively associated with said support and adjusting means for said needle cams, said adjusting means forming a component part of said unitary structure.

8. A cam block for knitting machines comprising as a unitary structure, a support, stitch drawing cams adjustably connected to said support, sinker cams attached to said support and means for adjusting the position of one of said sinker cams whereby the extent to which sinkers are to be projected by said cam may be varied.

9. A cam block for knitting machines having slidably mounted therein stitch drawing cams, means for adjusting said cams, a needle raising cam mounted to slide into and from active and inactive positions, said raising cam having means associated therewith for locking the same in either of these positions.

10. A cam block for knitting machines comprising a support, guideways in said support, a cross-head vertically slidable in said guideways and having needle actuating cams secured thereto, means for adjusting said cross-head and its attached cams vertically in said guideway comprising a spindle rotatable within said support, eccentric means at one end of said spindle engaging in a suitable bearing within said cross-head, a worm wheel at the other end of said spindle and a worm screw operatively associated with said worm wheel whereby the wheel and spindle may be rotated for the purpose of adjusting said cams.

11. A cam block for knitting machines comprising as a unitary structure, a support, needle cams and jack cams mounted on said support, a sinker cam assembly mounted as a portion of said unitary structure, means for vertically positioning said sinker cam assembly upon said support, sinker advancing and retracting cams mounted as units of said assembly, means for adjusting said advancing cam substantially radially of a needle circle with which the cam block is to be associated.

12. In a knitting machine a needle cylinder having needles therein, a support attached to said needle cylinder, sinkers cooperating with said needles and having outer ends fulcrumed upon said support and their inner ends guided within slots formed on an extension of said needle cylinder, jacks operatively mounted in said needle cylinder for actuating said sinkers whereby they will cooperate in measuring stitches, in combination with a cam block formed as a unitary structure said cam block having needle, jack and sinker cams mounted thereon for cooperation with their respective elements, said needle, jack and sinker cams each having individual means whereby it may be adjusted for the purposes herein described.

ROBERT H. LAWSON.
WILLIAM L. SMITH, Jr.